United States Patent [19]
Kelly, Jr. et al.

[11] Patent Number: 4,698,631
[45] Date of Patent: Oct. 6, 1987

[54] SURFACE ACOUSTIC WAVE PIPE IDENTIFICATION SYSTEM

[75] Inventors: Joseph L. Kelly, Jr.; Mig A. Howard, both of Houston, Tex.; Paul A. Nysen, Sunnyvale; Colin A. Hacking, Palo Alto, both of Calif.

[73] Assignee: Hughes Tool Company, Houston, Tex.

[21] Appl. No.: 943,338

[22] Filed: Dec. 17, 1986

[51] Int. Cl.⁴ ............................................. G01V 1/00
[52] U.S. Cl. ................................... 340/853; 367/911; 342/44; 175/40
[58] Field of Search ............... 340/853, 854, 860, 855; 175/40, 45, 250, 255; 367/911, 912; 342/44

[56] References Cited

U.S. PATENT DOCUMENTS

| | | | |
|---|---|---|---|
| 2,166,212 | 7/1939 | Hayward | 33/134 |
| 2,629,257 | 2/1953 | Link | 73/151 |
| 3,706,094 | 12/1972 | Cole et al. | 342/44 |
| 3,981,011 | 9/1976 | Bell | 342/44 |
| 4,061,967 | 12/1977 | Hall | 324/260 |
| 4,156,229 | 5/1979 | Shawhan | 340/18 P |
| 4,202,490 | 5/1980 | Gunkel et al. | 235/449 |
| 4,468,959 | 9/1984 | Roberts | 73/151 |

Primary Examiner—Charles T. Jordan
Assistant Examiner—John W. Eldred
Attorney, Agent, or Firm—James E. Bradley

[57] ABSTRACT

A drill pipe identification system automatically provides an identification number for each drill pipe as the drill pipe is being lowered into or withdrawn from the well. The system has a SAW identification device which is mounted in a cylindrical cavity which is formed within a tool joint of each section of drill pipe. The cavity has an aperture leading to the exterior of the tool joint to allow radio frequency signals to be received and reradiated. The SAW device receives signals from a transmitter and receiver, modulates the signals and reradiates them in a manner that corresponds to an encoded number in the SAW device.

6 Claims, 9 Drawing Figures

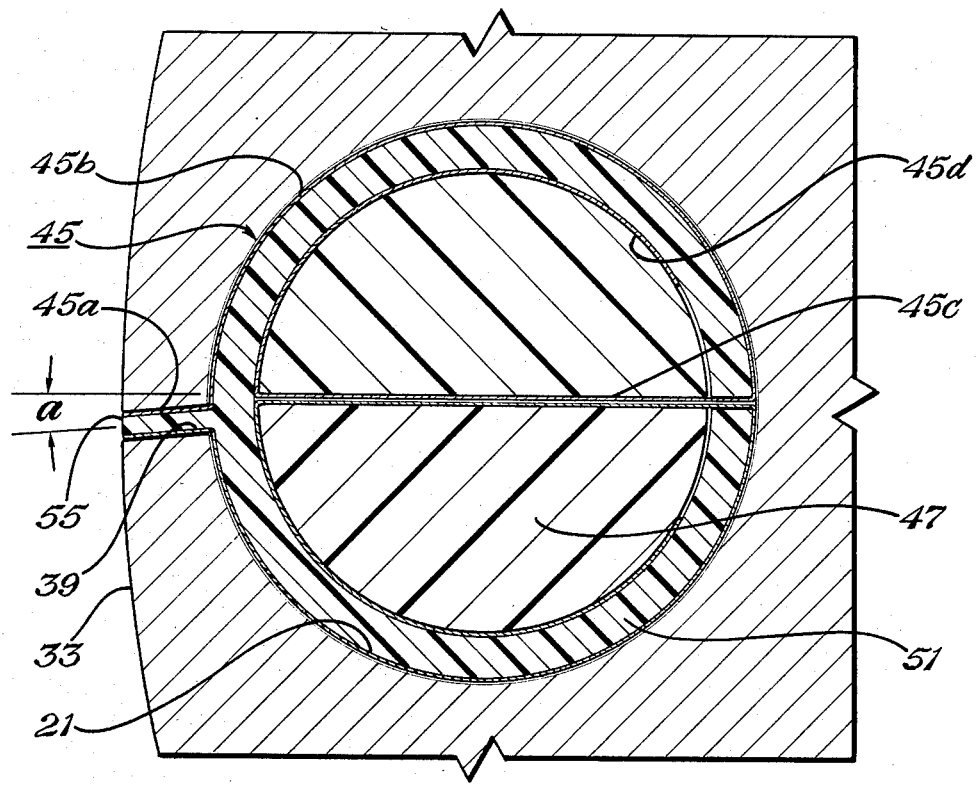
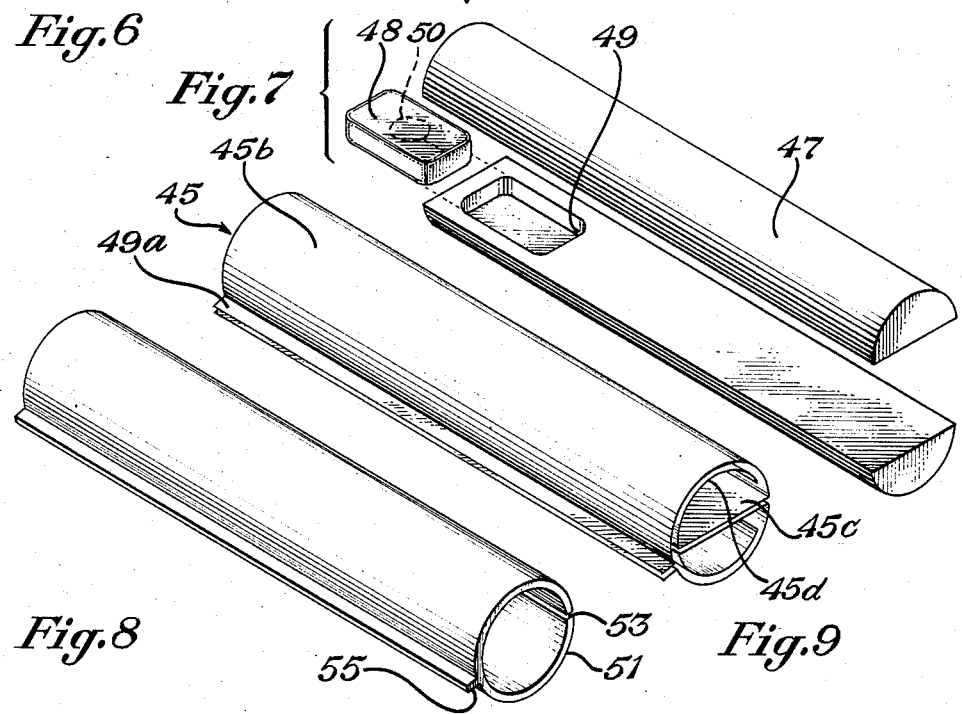

SURFACE ACOUSTIC WAVE PIPE IDENTIFICATION SYSTEM

BACKGROUND OF THE INVENTION

1. Field of the Invention

This invention relates in general to a system for identifying a number encoded into a section of drill pipe as the drill rig raises and lowers the string of drill pipe, and in particular to such a system employing surface acoustic wave devices.

2. Description of the Prior Art

In drilling wells, a string of drill pipe is employed to rotate a drill bit. The string is made up of sections of drill pipe about thirty feet in length and screwed together. It is very important that fatigue does not develop in any of the drill pipe sections to such extent that the drill pipe would part. Retrieving the section of drill pipe which has been lost in the hole can be very expensive.

Fatigue is more likely to occur in deviated wells which are commonly drilled in offshore locations. Deviated wells result in bending of the pipe as it is rotated, placing greater stress than in a straight well. To avoid overusing the string in deviated wells, the operator must keep track of the footage drilled, then retire the string before the danger of fatigue occurs. Keeping track of the string is not an easy task since a drill string can be used for drilling many wells. Also, the sections of the string may be interchanged with sections from other strings. In addition, some of the sections may have been primarily located in portions of the well that curve more sharply than in other areas of the well, thus subjecting them to greater stress than the sections which have been run primarily in straight portions of the hole.

No means is currently employed for identifying individual drill pipe sections. The drill pipe sections are pulled in and out of the well too quickly to be manually identified by anything such as a serial number stamped on the drill pipe. U.S. Pat. Nos. 4,061,967, James R. Hall, Dec. 6, 1977 and 4,202,490, Walter A. Gunkel et al., May 13, 1980, disclose systems for automatically detecting an identification number on each drill pipe section as the drill pipe moves through the rig floor. However, none of these systems are commercially available.

In recent years, surface acoustic wave technology, normally called SAW technology, has been used to identify various objects. This technology includes a SAW tag which has a chip and an antenna. The chip consists of a base substrate of piezoelectric material onto which an aluminum film pattern of interdigitated transducers is deposited. The transducers resemble, under a microscope, opposing combs with interlaced teeth. Unique coding of the device is achieved photographically by modifying the reflector mechanism.

A transmitter/receiver sends out a radio frequency signal which is picked up by the antenna of the SAW tag. The electromagnetic energy received by the SAW tag antenna is converted into acoustic sound energy in the form of ultrasonic surface acoustic waves which propagate along the SAW substrate of the chip and are reflected by a reflecting structure in the acoustic path. The reflectors modify the phase or amplitude of the ultrasonic waves to give the device its unique code.

The ultrasonic waves are then converted by the transducers on the SAW tag back into electromagnetic energy or "echoes", which are reradiated back to the transmitter and receiver. The reradiated signal has a distinctive code which has been predetermined by the photographic trimming of the reflector structure. The signal received by the transmitter/receiver is processed and converted into a digital signal which is stored in a memory unit.

The SAW technology has been proposed for various applications used in identifying devices. The use of SAW technology has not before been proposed for identifying drill pipe sections. The use in drill pipe presents a formidable challenge. The identification tag must be mounted to the drill pipe such that it could handle high temperatures and high pressures in the well bore, and for extended periods of time exceeding several hundred hours. Also, the drill pipe is subjected to shock and vibration which can affect the reliability of such a device.

SUMMARY OF THE INVENTION

In this invention, a SAW identification tag is located in a cylindrical cavity formed within a tool joint of each section. The cavity has an aperture leading to the exterior of the tool joint. The identification tag includes a SAW chip and an antenna located in the cavity. The chip has means for reradiating through the antenna and the aperture a signal that corresponds to a selected digital number that is encoded into the chip.

A transmitter/receiver is located on the drill rig. The transmitter/receiver includes an antenna mounted adjacent the rig floor for sending out a radio frequency signal to the identification tags as the drill pipe moves through the rig floor. The antenna of the transmitter and receiver receives the echoed or reradiated signals from the identification tags. the transmitter/receiver provides a digital code corresponding to the digital number that is encoded in the chip. The code is stored in a computer.

BRIEF DESCRIPTION OF THE DRAWING

FIG. 6 is an enlarged sectional view taken along the line VI—VI of FIG. 4.

FIG. 7 is a perspective view illustrating the non-conductive body portions of the SAW identification tag illustrated in FIG. 6.

FIG. 8 is a perspective view illustrating a non-conductive sleeve used in the SAW identification as shown in FIG. 6.

FIG. 9 is a perspective view illustrating the metal antenna portion of the SAW identification device shown in FIG. 6.

DESCRIPTION OF THE PREFERRED EMBODIMENT

Figure 2:
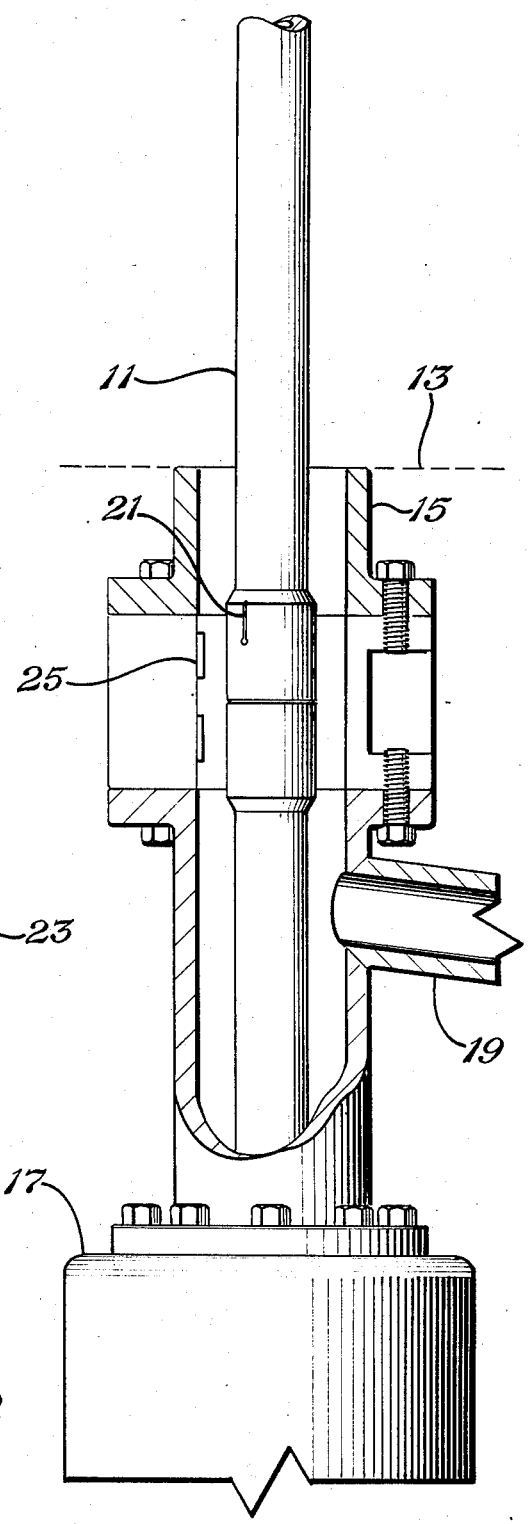
FIG. 2 is a partial schematic view illustrating portions of a drill string being lowered through part of a drill rig.

Referring to FIG. 2, portions of two drill pipe sections 11 are shown being lowered or raised through a drilling rig floor 13. The drill pipe sections 11 pass through a nipple 15 which is mounted to the top of a blowout preventer 17. A return line 19 extends outwardly from the nipple 15 for drilling mud to flow for recleaning and recirculation.

Each drill pipe section 11 has a cavity 21 located near its lower end which contains an identification device or tag 23, shown in FIG. 2. The ID tag 23 is a SAW device positioned to receive radio frequency pulses from an antenna 25. The antenna 25 is located in the nipple 15.

Figure 3:
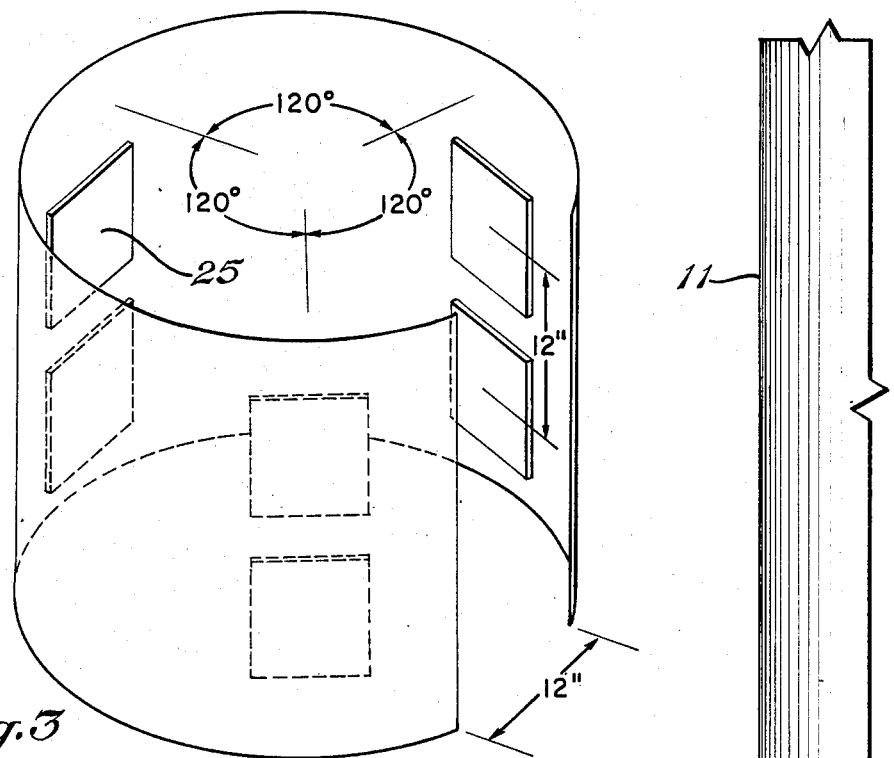
FIG. 3 illustrates placement of the antennas for the transmitter and receiver for the system of FIG. 1.

As shown in FIG. 3, the antenna 25 is in three sections spaced 120 degrees apart. Each section of antenna 25 is connected with the other in parallel, and they are positioned so as to be assured that the signal will be received by the signal ID tag 23 located in the drill pipe 11. Also, as shown in FIG. 3, there is an upper and lower array of antennas 25 spaced vertically apart from each other. The upper and lower arrays are not connected to each other. The two spaced apart arrays are used to determine whether the drill pipe 11 is being lowered into the well or being raised from the well.

Figure 1:
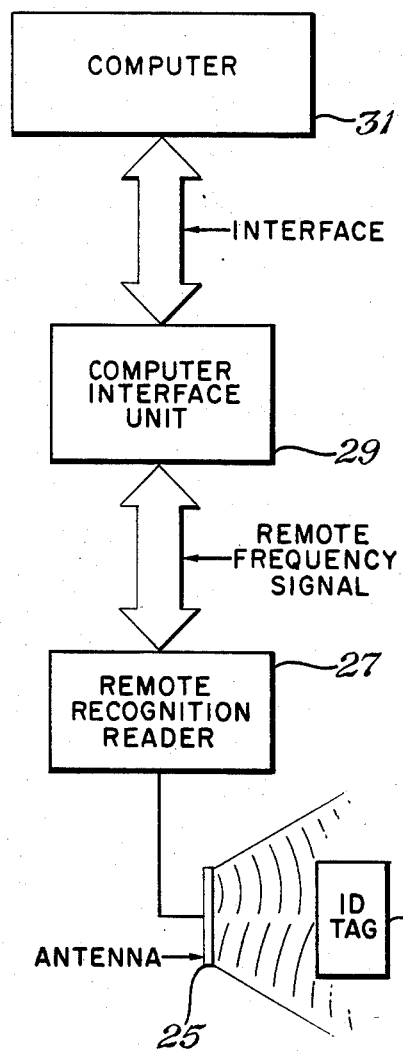
FIG. 1 is a schematic diagram illustrating the system of this invention.

Referring again to FIG. 1, the antenna 25 will be connected to a remote recognition reader 27. The remote recognition reader 27 provides radio frequency bursts at the rate of about sixty per second which are beamed through the antennas 25 to the identification tags 23. The remote recognition reader 27 also senses the "echoes" or reradiated signals returning from the identification tag 23. The reradiated signals have been phase modulated in accordance with the particular binary code encoded in the chip of the identification tag 23.

The remote recognition reader 27 forwards the signals received, which are in the audio frequency range, back to a computer interface unit 29 which demodulates the return signals and converts them to a digital code that corresponds to the encoded number in the identification tag 23. The digital code is stored in the memory of a computer 31.

Figures 4, 5:
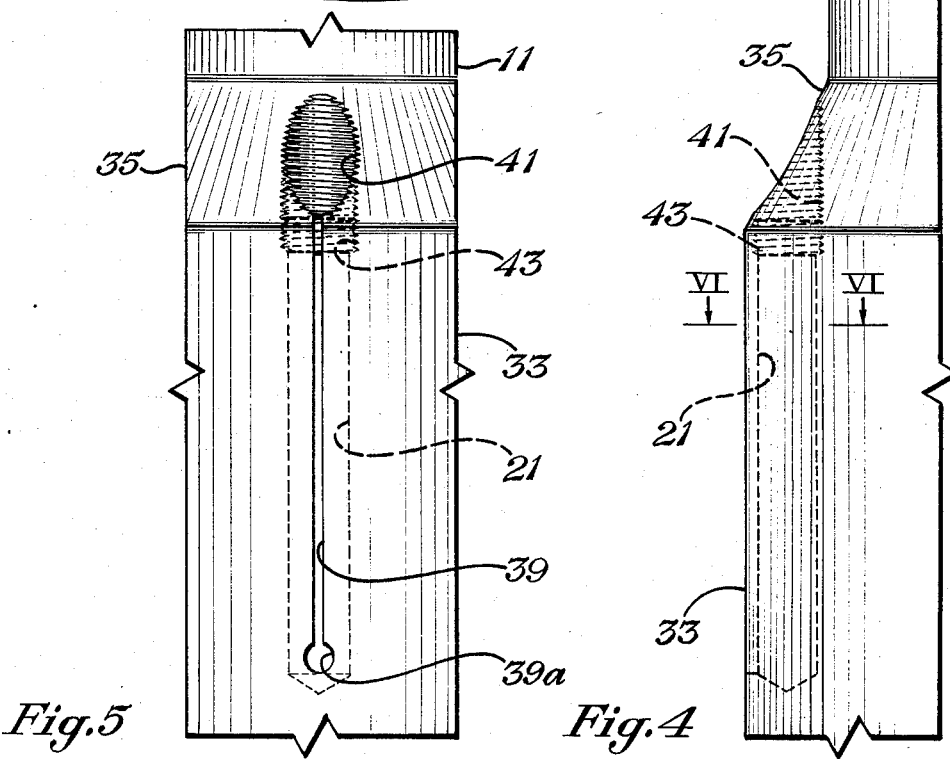
FIG. 4 is a partial side view of a portion of a section of drill pipe, showing a cavity for receiving a SAW identification tag.
FIG. 5 is a partial side view of the tool joint shown in FIG. 4.

Referring to FIGS. 4 and 5, each drill pipe section 11 has a tool joint 33 on each end containing threads for connection to adjacent drill pipe sections 11. The lower tool joint 33 is shown in FIGS. 4 and 5. It has a frustoconical shoulder 35 which leads from the drill pipe section to the larger diameter tool joint 33. Cavity 21 is drilled into the tool joint 33 for receiving the ID tag 23. The cavity 21 extends from the shoulder 35 downwardly, preferably about seven and one half inches.

As shown in FIG. 5, a slot 39 extends from the cylindrical cavity 21 to the exterior of the tool joint 33. Slot 39 is rectangular, having a circular hole 39a at its bottom, and extends into the shoulder 35 at its top. The width of slot 39 is preferably only about 0.034 inch, which is considerably less than the diameter of the cavity 21, which is about 0.625 inch. Slot 39 is located substantially in a plane that extends along a radial line emanating from the axis of the tool joint 33. A plurality of threads 41 are formed in the upper end of the cavity 21 for receiving a retaining plug 43. Cavity 21 has an axis that is parallel to and offset from the axis of the tool joint 33. Slot 39 is parallel to the axis of the cavity 21.

Referring to FIG. 6, the SAW tag 23 includes an antenna 45, which is a slot coupled ridge wave guide structure. The slot 39 serves as a means for coupling the identification tag 23 to free space surrounding the tool joint 33. The antenna 45 is buried in the tool joint 33 in the cavity 21, and acts as a resonant cavity to back the slot 39.

The antenna 45 is a rolled and folded copper sheet made up of two separate halves in the embodiment shown. Each half begins with a key portion 45a that extends through the slot 39 from the exterior of the tool joint 33 to the cavity 21. The key portion 45a leads to an outer ridge portion 45b which is a semicylindrical member. The outer ridge portion 45b and the key portion 45a are in contact with the metal of the tool joint 33. The outer ridge portion 45b extends substantially to the opposite side from the slot 39. It then bends into a flat vertical web portion 45c that extends back generally toward the slot 39. The web portion 45c does not extend the full diameter of the cavity 21, rather terminates a selected distance from the opposite wall.

At the termination, it bends into an inner ridge portion 45d which extends back around concentric with the outer portion 45b. The inner portion 45d terminates a selected distance from the web portion 45c, that is about 10 degrees. The two inner portions 45d combined thus extend about 340 degrees. Each half of the antenna 45 is constructed in the same manner, and the webs 45c abut together as shown in FIG. 6. The ridge gap between the inner and outer portions 45b and 45d is about 0.040 inch. The length of the antenna 45 is preferably about 6.41 inch.

As shown in FIG. 6, the slot 39 is not located in the same plane that contains the web portions 45c. Rather, the plane containing the web portions 45c intersects the plane containing the slot 39 at an angle a that is about 5 degrees.

Referring now to FIG. 7, two non-conductive body halves 47, preferably of Teflon, are located in the spaces between the webs 45c and the inner ridge portions 45d. A cavity 49 is formed in one of the body halves 47 for receiving a chip 48 which contains the SAW device. The chip 48 will have an inductive loop 50 (shown by dotted lines) that is bonded to the chip 48 and aligns with the plane of the web 45c to transmit energy. The loop 50 need not be physically bonded nor touch the web 45c, because signals will be transmitted inductively.

Referring to FIG. 8, the ridge gap between the inner ridge portion 45d and the outer ridge portion 45b is filled by a non-conductive sleeve 51, also preferably of Teflon. Sleeve 51 is sized to fit within the spaces between the ridge portions 45b and 45d. A slot 53 on one end accommodates the webs 45c. A key 55 formed on the outer end locates within the slot 39 and separates the key portions 45a from each antenna half.

In operation, the SAW chip 48 will be installed in the cavity 49 (FIG. 7). The assemblied ID tag 23 is inserted into the cavity 21 and retained by the retainer plug 43 (FIG. 4).

As the drill pipe moves through the space between the antennas 25 as shown in FIGS. 2 and 3, radio frequency signal from the antennas 25 will be received by the ID tag 23. The ID tag 23 will convert the radio frequency energy into acoustic energy which travels along the substrate of the ID tag 23. The SAW device in the ID tag 23 modulates the signal corresponding to the binary code formed on the substrate, and reradiates it back through the antenna 45 (FIG. 6) to the antennas 25.

The antennas 25 forward the signal to the remote recognition reader 27. The computer interface 29 demodulates the signal and converts it into a digital form which passes through the computer interface 29 and is stored in a computer 31. Other information concerning the time of day and particular depth of drilling can be stored in the computer at the same time to correlate the information for fatigue analysis.

Also, the vertical spacing of the antennas 25 allows the determination as to whether or not the pipe is going into or out of the hole. In one method, two separate remote recognition readers are used to separately detect signals. The sequence at which the signals are detected will determine whether or not the pipe is being lowered or raised. In another embodiment, the bottom array of antennas 25 is delayed by one-fourth of a wave length or 90 degrees. Consequently, as the tag 23 passes through the read zone, there is an inflection in the phase of the echo. This inflection is of opposite sense between upward and downward motion.

The invention has significant advantages. It allows the automatic reading of an identification number of each drill pipe section as it is being raised and lowered into the well. The device does not require any rotating components which might interfere with other operations. The ID tag in the drill pipe section is passive and requires no maintenance. Many combinations of numbers are available. The inductive coupling between the chip and the antenna reduces the chances for damage due to shock and vibration.

While the invention has been shown in only one of its forms, it should be apparent to those skilled in the art that it is not so limited, but is susceptible to various changes without departing from the scope of the invention.

We claim:

1. A system for detecting an identification number on tubular drill string sections as they are moved into and out of a well through the rig floor of a drill rig, comprising in combination:
   a cavity formed within the sections of the drill string;
   an aperture leading from the cavity to the exterior of the section;
   a SAW identification device including a SAW chip and an antenna located in the cavity and extending into the aperture, the chip having means for reradiating through the antenna and out the aperture a signal that corresponds to a selected digital number encoded in the chip;
   transmitter and receiver means including an antenna adapted to be mounted adjacent the rig floor, for sending radio frequency signals through the aperture to the identification device as the drill string moves up and down through the rig floor, for receiving the reradiated signals from the identification device, and for providing a digital code corresponding to the digital number encoded in the chip; and
   memory means for receiving and storing the digital code from the transmitter and receiver means.

2. A system for detecting an identification number on tubular drill string sections as they are moved into and out of a well through the rig floor of a drill rig, comprising in combination:
   an elongated cavity formed within a wall of the sections of the drill string, the cavity having an elongated aperture leading to the exterior of the section;
   a SAW identification device located in the cavity, the SAW identification device including a SAW chip and an antenna which extends from the cavity into the aperture, the chip having means for receiving a radio frequency signal through the antenna and reradiating the signal through the antenna in a modulated form that corresponds to a selected digital number encoded in the chip;
   the aperture being of smaller width than the width of the identification device located in the cavity to retain the identification device in the cavity;
   transmitter and receiver means adapted to be located on the drill rig for sending radio frequency signals by an antenna means to the identification device as the drill string moves up and down through the rig floor, for receiving by the antenna means the reradiated signals from the identification device, and for providing a digital code corresponding to a digital number encoded in the chip;
   the antenna means being a pair of vertically spaced apart antennas adapted to be mounted adjacent the rig floor, the transmitter and receiver means having means for determining the sequence of when the reradiated signals are received by the antenna means so as to determine the direction of movement of the drill string.

3. A system for detecting an identification number on drill pipe sections as they are moved into and out of a well through the rig floor of the drill rig, each drill pipe section being of the type having a threaded tool joint on each end, defining a shoulder, the system comprising in combination:
   a cylindrical cavity formed within a wall of one of the tool joints of each section, the cavity having an axis parallel with the axis of the tool joint and intersecting the shoulder;
   an elongated slot parallel with the axis of the cavity and extending outward from the cavity to the exterior of the tool joint, the slot having a width less than the diameter of the cavity;
   a SAW identification device including a SAW chip and an antenna, a portion of the antenna being located in the cavity and a portion extending into the slot, the chip having means for receiving a radio frequency signal through the antenna and reradiating the signal through the antenna in a modulated form that corresponds to a selected digital number encoded in the chip;
   transmitter and receiver means adapted to be located on the drill rig including an antenna adapted to be mounted adjacent the rig floor, for sending radio frequency signals to the identification device as the drill pipe sections move through the rig floor, for receiving the reradiated signals from the identification device, and for providing a digital code corresponding to the digital number encoded on the chip; and
   memory means for receiving and storing the digital code from the transmitter and receiver means.

4. A section of a tubular drill string having an identification device, comprising in combination:
   a cylindrical cavity formed within a wall of the section, the cavity having an axis;
   an elongated slot parallel with the axis of the cavity and extending outward from the cavity to the exterior of the section, the slot having a width less than the diameter of the cavity;
   a SAW identification tag including a SAW chip and an antenna located in the cavity, the chip having means for receiving a radio frequency signal through the antenna and reradiating the signal in a modulated form that corresponds to a selected digital number encoded in the chip;

the antenna comprising a curved ridge extending cylindrically and concentrically within the cavity, the ridge being of smaller diameter than the cavity, defining a ridge gap, the antenna further including a flat web extending substantially across the cavity and bisecting the ridge, the chip being coupled to the web for receiving and reradiating the signals, the antenna further having a key portion extending into the slot; and a non-conductive filler material located inside the cavity and the slot surrounding the key portion, the web and the ridge.

5. A section of a tubular drill string having an identification device, comprising in combination:

a cylindrical cavity formed within a wall of the section, the cavity having an axis;

an elongated slot parallel with the axis of the cavity and extending outward from the cavity to the exterior of the section, the slot having a width less than the diameter of the cavity;

a SAW identification tag including a SAW chip and an antenna located in the cavity, the chip having means for receiving a radio frequency signal through the antenna and reradiating the signal in a modulated form that corresponds to a selected digital number encoded in the chip;

the antenna comprising inner and outer cylindrical portions concentrically carried in the cavity, the outer portion extending from the exterior of the slot around the wall of the cavity, the inner portion being of lesser diameter, defining a ridge gap between the portions, the inner portion extending less than 360 degrees, the inner portion joining a flat web that extends across opposite sides and joins the outer portion;

an inductive loop secured to the chip and positioned next to the web for inductively coupling signals between the antenna and the chip; and a non-conductive filler material located in the cavity and the slot surrounding the antenna.

6. A section of a tubular drill string having an identification device, comprising in combination:

a cylindrical cavity formed within a wall of the section, the cavity having an axis parallel with and offset from the axis of the section;

an elongated slot parallel with the cavity and extending outward from the cavity to the exterior of the section, the slot having a width less than the diameter of the cavity;

a SAW identification tag including a SAW chip and an antenna located in the cavity, the chip having means for receiving a radio frequency signal through the antenna and reradiating the signal in a modulated form that corresponds to a selected digital number encoded into the chip;

the antenna comprising a flat vertically oriented web, a curved portion spaced inwardly from the wall of the cavity, defining a ridge gap, and a key portion extending into the slot;

the plane containing the web intersecting the plane containing the slot by selected acute angle;

an inductive loop secured to the chip and positioned adjacent the web for inductively transmitting signals between the chip and the antenna; and non-conductive filler material located inside the slot and the cavity surrounding the antenna.

* * * * *